(12) United States Patent
Zhang et al.

(10) Patent No.: US 11,245,145 B2
(45) Date of Patent: Feb. 8, 2022

(54) SECONDARY BATTERY

(71) Applicant: CONTEMPORARY AMPEREX TECHNOLOGY CO., LIMITED, Fujian (CN)

(72) Inventors: Min Zhang, Fujian (CN); Shaojun Niu, Fujian (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 0 days.

(21) Appl. No.: 17/139,845

(22) Filed: Dec. 31, 2020

(65) Prior Publication Data

US 2021/0126305 A1 Apr. 29, 2021

Related U.S. Application Data

(63) Continuation of application No. PCT/CN2020/103360, filed on Jul. 21, 2020.

(30) Foreign Application Priority Data

Jul. 23, 2019 (CN) .......................... 201910667136.0

(51) Int. Cl.
*H01M 50/105* (2021.01)
*H01M 50/184* (2021.01)
(Continued)

(52) U.S. Cl.
CPC ....... *H01M 50/105* (2021.01); *H01M 50/169* (2021.01); *H01M 50/184* (2021.01); *H01M 50/186* (2021.01)

(58) Field of Classification Search
CPC .......................... H01M 50/105; H01M 50/184
See application file for complete search history.

(56) References Cited

U.S. PATENT DOCUMENTS

| 9,755,195 | B2 | 9/2017 | Cho et al. |
| 2015/0000117 | A1 | 1/2015 | Cho et al. |

(Continued)

FOREIGN PATENT DOCUMENTS

| CN | 104183798 A | 12/2014 |
| CN | 104584259 A | 4/2015 |

(Continued)

*Primary Examiner* — Haixia Zhang
(74) *Attorney, Agent, or Firm* — Scully Scott Murphy & Presser

(57) ABSTRACT

Embodiments of the present application disclose a secondary battery including an electrode assembly, a packaging bag and an electrode lead. The packaging bag includes a first packaging film and a second packaging film, the electrode assembly is disposed between the first packaging film and the second packaging film. The first packaging film and the second packaging film each include a main body portion, two extending portions and two connecting portions, the main body portion is located on one side of the electrode assembly in a thickness direction, the two connecting portions are respectively located on two sides of the electrode assembly in a transverse direction, the two extending portions respectively extend from two ends of the main body portion in the transverse direction and are respectively connected to the two connecting portions. Each extending portion includes a first arc region, an inclined region and a second arc region.

20 Claims, 5 Drawing Sheets

(51) Int. Cl.
*H01M 50/186* (2021.01)
*H01M 50/169* (2021.01)

(56) References Cited

U.S. PATENT DOCUMENTS

2015/0364729 A1    12/2015   Jang
2021/0234218 A1*    7/2021   Kwon ..................... B32B 7/12

FOREIGN PATENT DOCUMENTS

| | | |
|---|---|---|
| CN | 205645897 U | 10/2016 |
| CN | 110350112 A | 10/2019 |
| CN | 210040270 U | 2/2020 |
| EP | 2884556 B1 | 12/2017 |
| KR | 20110039011 A | 4/2011 |
| KR | 20130139026 A | 12/2013 |
| KR | 20140134916 A | 11/2014 |

* cited by examiner

SECONDARY BATTERY

CROSS-REFERENCE TO RELATED APPLICATIONS

This application is a continuation of International Application No. PCT/CN2020/103360, filed on Jul. 21, 2020, which claims priority to Chinese Patent Application No. 201910667136.0, filed to the Chinese Patent Office on Jul. 23, 2019 and entitled "SECONDARY BATTERY", the entire content of which is incorporated herein by reference.

TECHNICAL FIELD

Embodiments of the present application relate to the field of batteries, and in particular, to a secondary battery.

BACKGROUND

With the rapid development of portable electronic devices, requirements for battery energy density are getting higher and higher. In a secondary battery, a packaging bag made of an aluminum plastic film or a steel plastic film may be used to replace a metal housing to reduce weight of the battery and increase energy density.

An electrode assembly of the secondary battery is housed in the packaging bag, and edges of the packaging bag may be connected in a sealing manner by thermal compression. To achieve charging and discharging of the electrode assembly, the secondary battery further includes an electrode lead, and the electrode lead is connected to the electrode assembly and extends to an outside of the packaging bag.

In the known technology, there is usually a gap between the electrode assembly and the packaging bag. If the gap is too large, when the secondary battery vibrates, the electrode assembly shakes easily in the packaging bag, and the electrode assembly pulls the packaging bag through the electrode lead, which results in sealing failure easily. In addition, the electrode assembly will expand in charging and discharging processes. If the gap is too small, when the electrode assembly expands, the electrode assembly easily applies an acting force to the packaging bag, which results in sealing failure easily.

SUMMARY

In view of the problems in the background, an objective of the present application is to provide a secondary battery, which could improve sealing performance of the secondary battery.

To achieve the foregoing objective, the present application provides a secondary battery including an electrode assembly, a packaging bag and an electrode lead. The packaging bag includes a first packaging film and a second packaging film, the electrode assembly is disposed between the first packaging film and the second packaging film, and the electrode lead is connected to the electrode assembly and extends to an outside of the packaging bag in a longitudinal direction. The first packaging film and the second packaging film each include a main body portion, two extending portions and two connecting portions, the main body portion is located on one side of the electrode assembly in a thickness direction, the two connecting portions are respectively located on two sides of the electrode assembly in a transverse direction, and the two extending portions respectively extend from two ends of the main body portion in the transverse direction and are respectively connected to the two connecting portions. Each of the two extending portions includes a first arc region, an inclined region and a second arc region, the first arc region is connected to an end part of the main body portion in the transverse direction, the second arc region is connected to an end part of the connecting portion close to the main body portion in the transverse direction, and the inclined region is connected between the first arc region and the second arc region. The two connecting portions of the first packaging film are respectively connected to the two connecting portions of the second packaging film. In a section perpendicular to the longitudinal direction, a size of the electrode assembly in the transverse direction is W1, a size of an inner surface of the main body portion in the transverse direction is W2, a radius of an inner surface of the first arc region is R1, a radius of an inner surface of the second arc region is R2, and a size of an inner surface of the inclined region in the transverse direction is h. W1, W2, R1, R2 and h satisfy the following relational expression: $W2+2R1-1 \leq W1 \leq W2+2R1+2R2+2h+1$.

Preferably, W1, W2, R1, R2 and h satisfy the following relational expression: $W2+2R1-0.5 \leq W1 \leq W2+2R1+2R2+2h$.

Preferably, in the section perpendicular to the longitudinal direction, a size of the electrode assembly in the thickness direction is T. T, R1, R2 and h satisfy the following relational expression: $T/5 \leq R1+R2+h \leq T/2$.

Preferably, in the section perpendicular to the longitudinal direction, an included angle between the main body portion and the inclined region is 95°~150°.

Preferably, $R2 \leq R1$.

Preferably, the two connecting portions of the first packaging film are respectively a first connecting portion and a second connecting portion, the two connecting portions of the second packaging film are respectively a third connecting portion and a fourth connecting portion, the first connecting portion is connected to the third connecting portion, and the second connecting portion is connected to the fourth connecting portion. The first connecting portion and the third connecting portion each include a transition region and a welding region, the transition region is connected to the second arc region, and the welding region extends from an end part of the transition region away from the second arc region. The welding region of the first connecting portion is welded to the welding region of the third connecting portion to form a first sealing portion. In the transverse direction, a size of the transition region is 0.5 mm-5 mm.

Preferably, the first sealing portion is bent toward a direction close to the electrode assembly, and the first sealing portion is bonded to the inclined region through a colloid.

Preferably, a portion of the colloid is bonded to an outer surface of the first arc region.

Preferably, the electrode assembly includes a first electrode sheet, a second electrode sheet and a diaphragm, the diaphragm isolates the first electrode sheet from the second electrode sheet, and the first electrode sheet, the diaphragm and the second electrode sheet are wound into an integral body. The electrode assembly has a base region and two corner regions, the two corner regions are respectively located at two ends of the base region in the transverse direction; an outer surface of the base region is a flat plane, and an outer surface of each of the two corner region is an arc surface. In the transverse direction, the two ends of the main body portion are both beyond the base region.

Preferably, in each of the two corner region, the first electrode sheet is set in multiple layers, and a gap is provided between two adjacent layers of the first electrode sheet.

The beneficial effects of the present application are as follows: in the present application, a shake of an electrode assembly could be reduced, and a risk of pulling a packaging bag by the electrode assembly through an electrode lead is reduced, thereby improving sealing performance. Meanwhile, an acting force applied to the connecting portion 213 by the electrode assembly due to expansion could be reduced, thereby improving the sealing performance.

Figure 1:
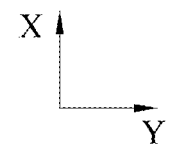
FIG. 1 is a schematic diagram of a secondary battery according to the present application.
Figure 1:
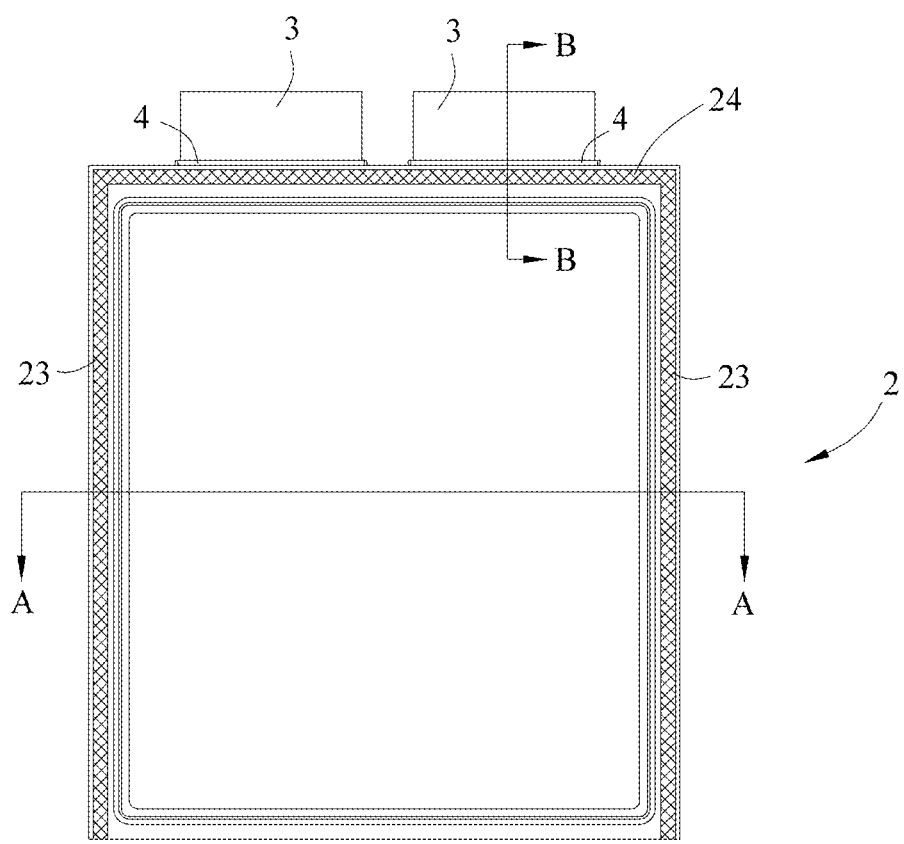

Reference signs are explained as follows:
1 electrode assembly
11 first electrode sheet
12 second electrode sheet
13 diaphragm
14 base region
15 corner region
2 packaging bag
21 first packaging film
211 main body portion
212 extending portion
212$a$ first arc region
212$b$ inclined region
212$c$ second arc region
213 connecting portion
213$a$ first connecting portion
213$b$ second connecting portion
213$c$ third connecting portion
213$d$ fourth connecting portion
2131 transition region
2132 welding region
214 protective layer
215 metal layer
216 heat sealing layer
22 second packaging film
23 first sealing portion
24 second sealing portion
25 concave chamber
3 electrode lead
4 insulating member
5 colloid
X longitudinal direction
Y transverse direction
Z thickness direction

DESCRIPTION OF EMBODIMENTS

To make the objectives, technical solutions, and advantages of the present application clearer and more comprehensible, the present application will be further described below in detail with reference to the accompanying drawings and embodiments. It should be understood that the specific embodiments described herein are merely used to explain the present application, but are not intended to limit the present application.

In the description of the present application, unless otherwise specified and limited explicitly, the terms "first", "second", "third" and "fourth" are merely intended for a purpose of description, and shall not be understood as an indication or implication of relative importance. The term "a plurality of" refers to more than two (including two). Unless otherwise specified or illustrated, the term "connection" should be understood broadly, for example, the "connection" may either be a fixed connection, or a detachable connection, or an integrated connection, or an electrical connection, or a signal connection; and the "connection" may either be a direct connection, or an indirect connection through an intermediary. Those of ordinary skill in the art may appreciate the specific meanings of the foregoing terms in the present application according to specific conditions.

In the description of the specification, it should be understood that the terms representing directions such as "up" and "down" described in the embodiments of the present application are described from the angles shown in the accompanying drawings, and should not be understood as limitation on the embodiments of the present application. The present application will be further described below in detail through the specific embodiments with reference to the accompanying drawings.

With reference to FIG. 1 to FIG. 4, a secondary battery of the present application includes an electrode assembly 1, a packaging bag 2, an electrode lead 3 and an insulating member 4.

Figure 7:
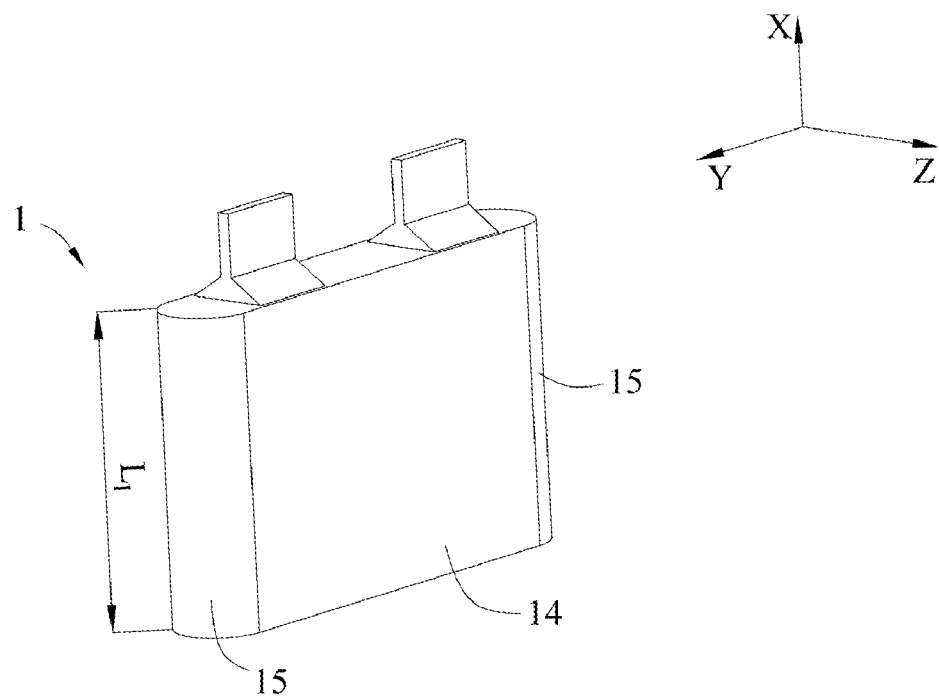
FIG. 7 is a schematic diagram of an electrode assembly of a secondary battery according to the present application.
Figure 8:
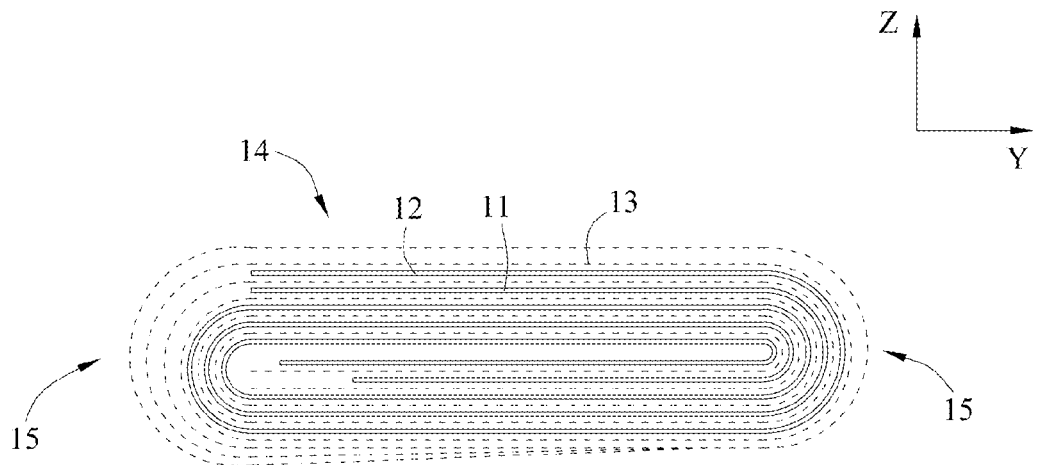
FIG. 8 is a sectional view of the electrode assembly of FIG. 7.

The electrode assembly 1 is a core member of the secondary battery for achieving charging and discharging functions. With reference to FIG. 7 and FIG. 8, the electrode assembly 1 includes a first electrode sheet 11, a second electrode sheet 12 and a diaphragm 13, and the diaphragm 13 isolates the first electrode sheet 11 from the second sheet 12. The first electrode sheet 11 includes a first current collector and a first active material layer coated on a surface of the first current collector, the first current collector may be aluminum foil, and the first active material layer includes a ternary material, lithium manganate or lithium iron phosphate. The second electrode sheet 12 includes a second current collector and a second active material layer coated on a surface of the second current collector, the second current collector may be copper foil, and the second active material layer includes graphite or silicon.

The electrode assembly 1 may be in a winding structure. Specifically, there is one first electrode sheet 11 and one second electrode sheet 12, and the first electrode sheet 11 and the second electrode sheet 12 are in banded structures. The first electrode sheet 11, the diaphragm 13 and the second electrode sheet 12 are stacked in sequence and wound more than two turns to form the electrode assembly 1.

The winding electrode assembly 1 may be in a flat shape. With reference to FIG. 7 and FIG. 8, the electrode assembly 1 has a base region 14 and two corner regions 15, and the two corner regions 15 are respectively located at two ends of the base region 14 in a transverse direction Y. An outer surface of the base region 14 is a flat plane, an outer surface of each of the two corner region 15 is an arc surface, and an area of the flat plane is larger than an area of the arc surface. Two flat planes of the base region 14 face each other in a thickness direction Z, and arc surfaces of the two corner regions 15 face each other in the transverse direction Y. With respect to the arc surface, the flat plane is a relatively smooth surface, and the flat plane is not required to be a pure plane. In the corner regions 15, the first electrode sheet 11 and the second electrode sheet 12 are both set in multiple layers.

In an alternative embodiment, the electrode assembly 1 may also be in a laminated structure. Specifically, the first electrode sheet 11 is set in plurality, the second electrode sheet 12 is set in plurality, the plurality of first electrode sheets 11 and the plurality of second electrode sheets 12 are alternately stacked in the thickness direction Z, and the diaphragm 13 isolates the first electrode sheet 11 from the second electrode sheet 12. In the laminated electrode assembly 1, the first electrode sheets 11 and the second electrode sheets 12 are all sheet-shaped and substantially perpendicular to the thickness direction Z.

Figure 2:
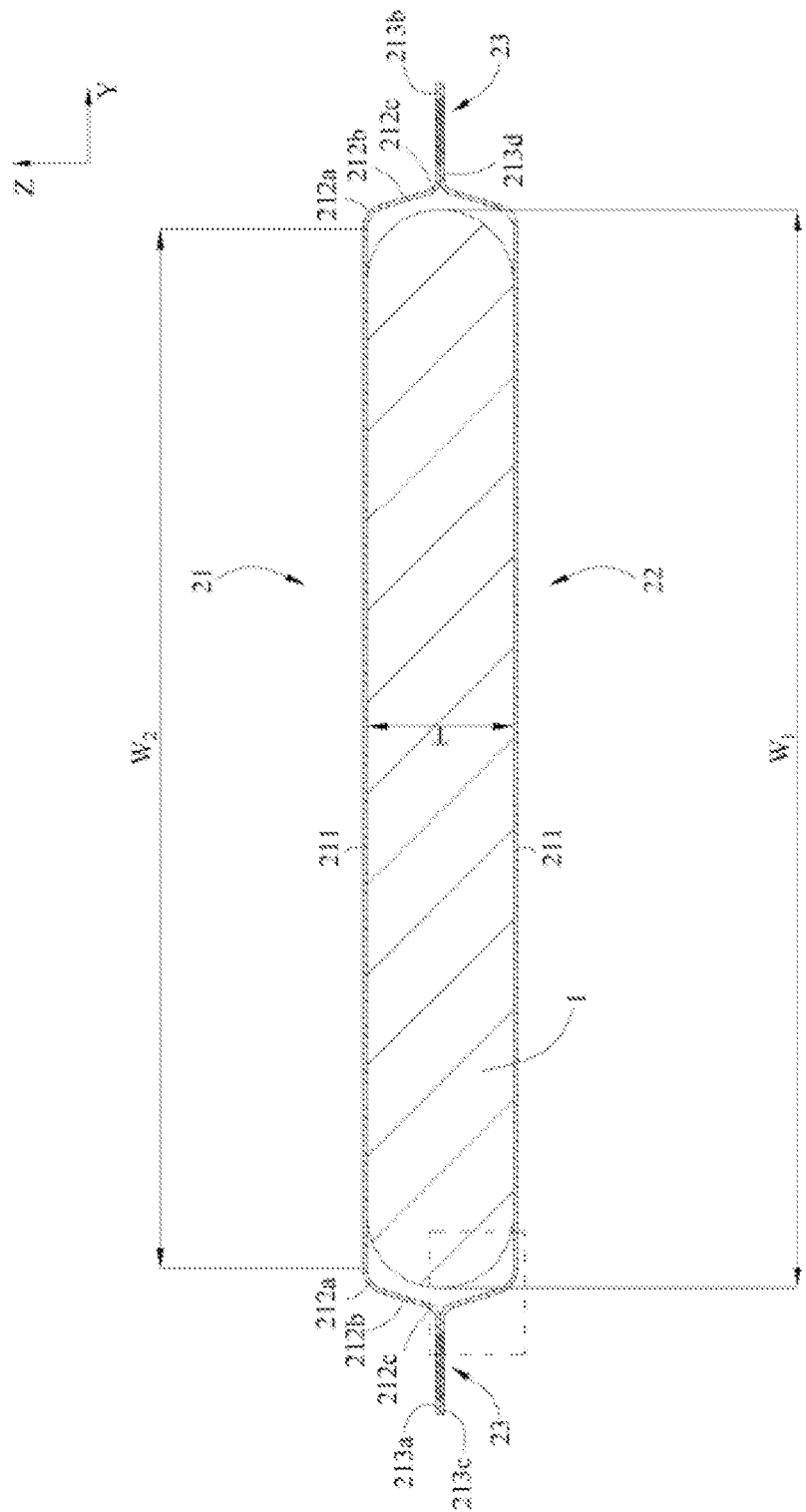
FIG. 2 is a sectional view of the secondary battery of FIG. 1 taken along a line A-A.

With reference to FIG. 2, the packaging bag 2 includes a first packaging film 21 and a second packaging film 22, and the first packaging film 21 and the second packaging film 22 may be arranged up and down in the thickness direction Z. The electrode assembly 1 is disposed between the first packaging film 21 and the second packaging film 22.

The first packaging film 21 and the second packaging film 22 may be disposed separately or integrally. For example, with reference to FIG. 5, the first packaging film 21 and the second packaging film 22 are formed by bending a piece of packaging film (for example, an aluminum plastic film, a steel plastic film or the like).

Concave chambers 25 may be formed on the first packaging film 21 and the second packaging film 22 by stamping. The concave chambers 25 may be configured to house the electrode assembly 1 and an electrolyte.

Figure 6:
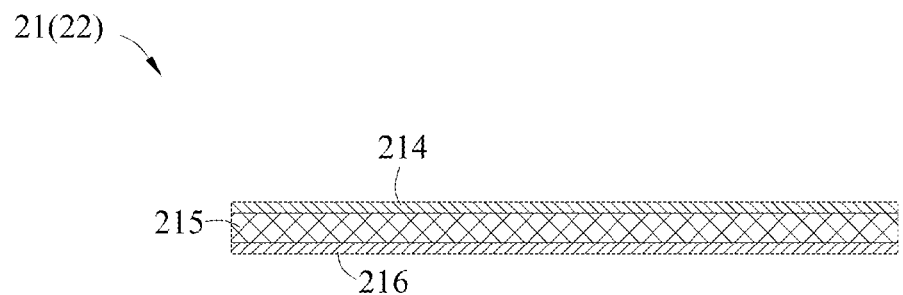
FIG. 6 is a sectional view of the packaging bag of FIG. 5.

The first packaging film 21 and the second packaging film 22 are both in multilayer structures. With reference to FIG. 6, the first packaging film 21 and the second packaging film 22 each include a protective layer 214, a metal layer 215 and a heat sealing layer 216, and the protective layer 214 and the heat sealing layer 216 are respectively disposed on two sides of the metal layer 215. Specifically, the heat sealing layer 216 may be disposed on a surface of the metal layer 215 facing the electrode assembly 1 through a binder, and the protective layer 214 may be disposed on a surface of the metal layer 215 away from the electrode assembly 1 through the binder.

A material of the protective layer 214 may be nylon or polyethylene glycol terephthalate, a material of the metal layer 215 may be aluminum foil or steel foil, and a material of the heat sealing layer 216 may be polypropylene.

With reference to FIG. 1, the first packaging film 21 and the second packaging film 22 are connected on outer sides of the electrode assembly 1 to form a sealing portion. The sealing portion may include a first sealing portion 23 and a second sealing portion 24, the first sealing portion 23 may be located on an outer side of the electrode assembly 1 in the transverse direction Y, and the second sealing portion 24 may be located on an outer side of the electrode assembly 1 in a longitudinal direction X. The first sealing portion 23 and the second sealing portion 24 may achieve sealing of the packaging bag 2 to avoid leakage of the electrolyte.

By thermal compression, the heat sealing layer 216 of the first packaging film 21 is welded to the heat sealing layer 216 of the second packaging film 22 to form the sealing portion. In the thermal compression process, the heat sealing layers 216 located at the sealing portion are melted and compressed. Therefore, after the molding by the thermal compression, a thickness of the sealing portion is less than a sum of thicknesses of the first packaging film 21 and the second packaging film 22 before the thermal compression.

Figure 4:
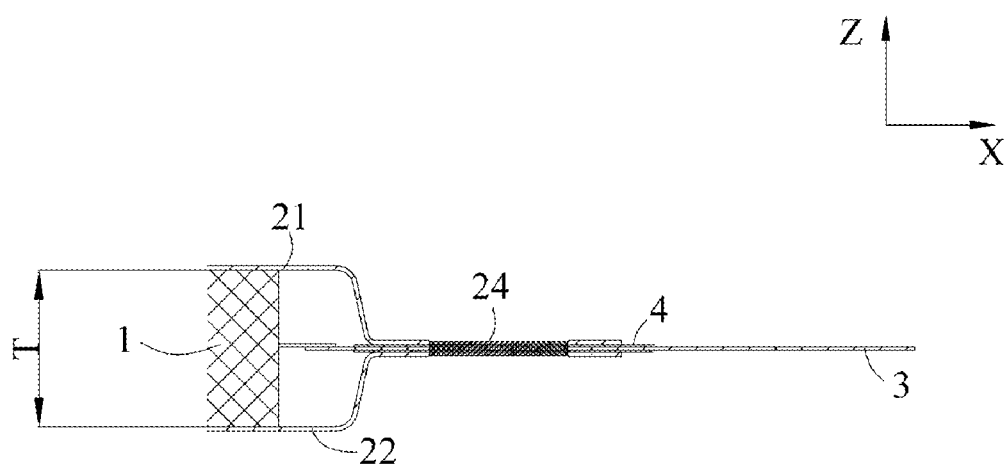
FIG. 4 is a sectional view of the secondary battery of FIG. 1 taken along a line B-B.

With reference to FIG. 4, the electrode lead 3 is connected to the electrode assembly 1, passes through the second sealing portion 24 and extends to an outside of the packaging bag 2 in the longitudinal direction X. Specifically, there may be two electrode leads 3, one electrode lead 3 is connected to the first current collector of the first electrode sheet, and the other electrode lead 3 is connected to the second current collector of the second electrode sheet. The two electrode leads 3 connect the electrode assembly 1 and other members outside the packaging bag 2, and then charging and discharging of the electrode assembly 1 are achieved. A material of the electrode lead 3 may be aluminum, nickel or copper plated with nickel.

In this embodiment, the two electrode leads 3 extend from the same side of the packaging bag 2 in the longitudinal direction X. Certainly, in an alternative embodiment, the two electrode leads 3 may also respectively extend from two sides of the packaging bag 2 in the longitudinal direction X.

The electrode lead 3 passes between the first packaging film 21 and the second packaging film 22. Since the heat sealing layer 216 is thin, the electrode lead 3 is easily in contact with the metal layer 215, causing safety risks. Therefore, the secondary battery of the present application is preferably provided with an insulating member 4.

There may be two insulating members 4. The two insulating members 4 isolate the two electrode leads 3 from the second sealing portion 24, respectively. Each insulating member 4 surrounds an outer side of a corresponding electrode lead 3. A part of the insulating member 4 is clamped between the first packaging film 21 and the second packaging film 22, so as to isolate the electrode lead 3 from the packaging bag 2 and reduce a risk of contact of the electrode lead 3 with the metal layer 215. A material of the insulating member 4 may be polypropylene.

Since a part of the insulating member 4 is clamped between the first packaging film 21 and the second packaging film 22, the heat sealing layers 216 of the first packaging film 21 and the second packaging film 22 are welded to the insulating member 4 in thermal compression.

Figure 3:
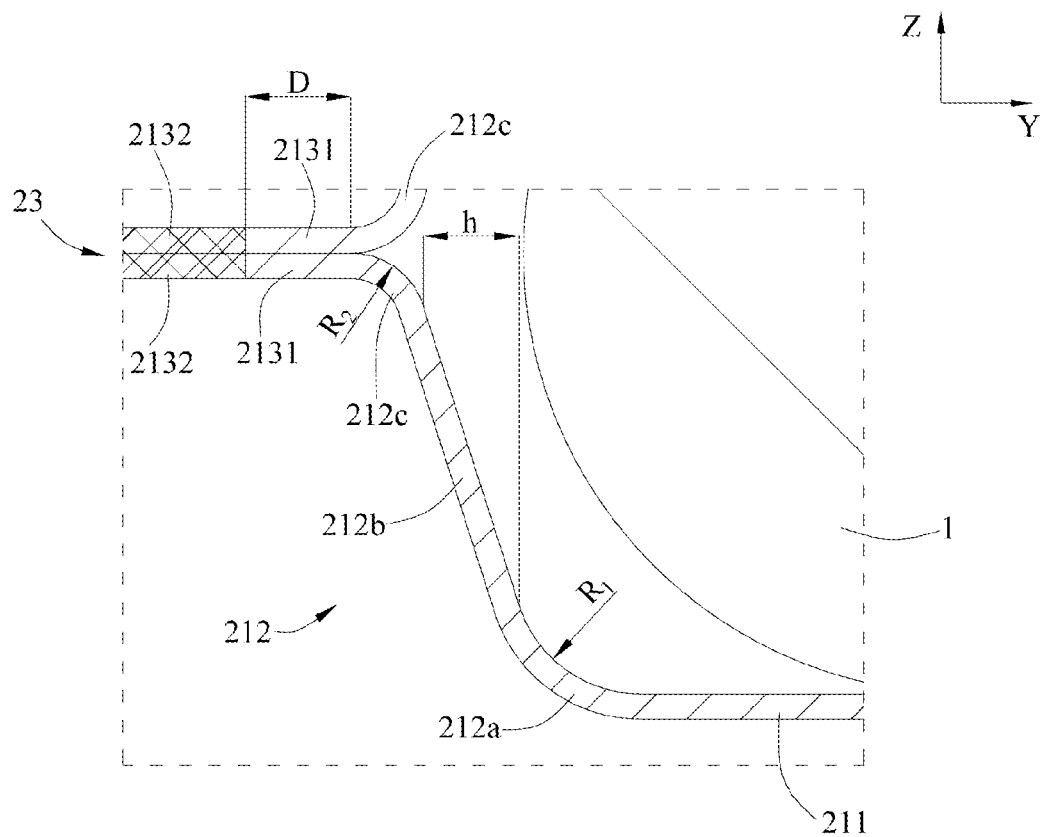
FIG. 3 is an enlarged view of the secondary battery of FIG. 2 in a block.

With reference to FIG. 2 and FIG. 3, from the appearance of the first packaging film 21 and the second packaging film 22, the first packaging film 21 and the second packaging film 22 each include a main body portion 211, two extending portions 212 and two connecting portions 213, the main body portion 211 is located on one side of the electrode assembly 1 in the thickness direction Z, the two connecting portions 213 are respectively located on two sides of the electrode assembly 1 in the transverse direction Y, and the two extending portions 212 respectively extend from two ends of the main body portion 211 in the transverse direction Y and are respectively connected to the two connecting portions 213.

The concave chambers 25 are each formed on the first packaging film 21 and the second packaging film 22, the main body portion 211 is a bottom wall of the concave chamber 25 in the thickness direction Z, and the two extending portions 212 are two side walls of the concave chamber 25 in the transverse direction Y, respectively.

Each of the two extending portion 212 includes a first arc region 212a, an inclined region 212b and a second arc region 212c, the first arc region 212a is connected to an end part of the main body portion 211 in the transverse direction Y, the second arc region 212c is connected to an end part of the connecting portion 213 close to the main body portion 211 in the transverse direction Y, and the inclined region 212b is connected between the first arc region 212a and the second arc region 212c.

Thicknesses of the main body portion 211, the first arc region 212a, the inclined region 212b and the second arc region 212c are ignored, the main body portion 211 is generally a plane perpendicular to the thickness direction Z, the first arc region 212a and the second arc region 212c are generally arc surfaces, and the inclined region 212b is generally a plane inclined with respect to the main body portion 211.

The concave chamber 25 of the first packaging film 21 and the concave chamber 25 of the second packaging film 22 are both made by a stamping process. If the first arc region 212a and the second arc region 212c are omitted so that the inclined region 212b is directly connected to the main body portion 211 and the connecting portion 213, in the stamping process, stress concentration occurs at a connection of the inclined region 212b and the main body portion 211 and a connection of the inclined 212b and the connecting portion 213, which results in cracking of the metal layer 215 easily and affects sealing performance. According to the present application, by providing the first arc region 212a and the second arc region 212c, stress may be dispersed in the stamping process, the stress concentration is reduced, and a risk of cracking of the metal layer 215 is reduced.

The two connecting portions 213 of the first packaging film 21 are respectively connected to the two connecting portions 213 of the second packaging film 22. Specifically, the two connecting portions 213 of the first packaging film 21 are respectively a first connecting portion 213a and a second connecting portion 213b, and the two connecting portions 213 of the second packaging film 22 are respectively a third connecting portion 213c and a fourth connecting portion 213d. The first connecting portion 213a and the third connecting portion 213c are located on one side of the electrode assembly 1 in the transverse direction Y, and the first connecting portion 213a is connected to the third connecting portion 213c, thereby sealing the electrode assembly 1 from the one side. The second connecting portion 213b and the fourth connecting portion 213d are located on the other side of the electrode assembly 1 in the transverse direction Y, and the second connecting portion 213b is connected to the fourth connecting portion 213b, thereby sealing the electrode assembly 1 from the other side.

In a section perpendicular to the longitudinal direction X, a size of the electrode assembly 1 in the transverse direction Y is W1. The smaller a value of W1 is, and in the transverse direction Y, the larger a gap between the electrode assembly 1 and the extending portion 212 is. If the gap is too large, when the secondary battery vibrates, the extending portion 212 is unable to effectively limit the electrode assembly 1 to shake in the transverse direction Y, and the shaking electrode assembly 1 pulls the second sealing portion 24 through the electrode lead 3, which results in sealing failure of the packaging bag 2 easily.

The electrode assembly 1 expands in charging and discharging processes, the expanded electrode assembly 1 pushes the main body portions 211 in the thickness direction Z, and the main body portion 211 pulls the connecting portion 213 through the extending portion 212. The greater the value of W1 is, and in the transverse direction Y, the smaller the gap between the electrode assembly 1 and the extending portion 212 is. If the gap is too small, when the electrode assembly 1 expands, the extending portion 212 is less deformable and unable to effectively release an expansion force, and the expansion force is transferred to the connecting portion 213, which results in failure of connection of the first packaging film 21 and the second packaging film 22 easily, and causes the leakage of the electrolyte.

With reference to FIG. 3, a size of an inner surface of the main body portion 211 in the transverse direction Y is W2, a radius of an inner surface of the first arc region 212a is R1, a radius of an inner surface of the second arc region 212c is R2, and a size of an inner surface of the inclined region 212b in the transverse direction Y is h.

The inventor found that when W1, W2, R1, R2 and h satisfy the following relational expression $W2+2R1-1 \leq W1 \leq W2+2R1+2R2+2h+1$, the shake of the electrode assembly 1 may be reduced, a risk of pulling the packaging bag 2 by the electrode assembly 1 through the electrode lead 3 is reduced, thereby improving the sealing performance. Meanwhile, according to the present application, an acting force applied to the connecting portion 213 when the electrode assembly 1 expands can also be reduce, and the sealing performance of the second battery is improved.

Preferably, W1, W2, R1, R2 and h satisfy the following relational expression: $W2+2R1-0.5 \leq W1 \leq W2+2R1+2R2+2h$.

In the section perpendicular to the longitudinal direction X, a size of the electrode assembly 1 in the thickness direction Z is T. The greater a value of T is, the greater depths of the concave chamber 25 of the first packaging film 21 and the concave chamber 25 of the second packaging film 22 in the thickness direction Z are; and in the molding process of the concave chambers 25, the more the first packaging film 21 and the second packaging film 22 are much stretched, the thinner the metal layers 215 of the extending portions are. If the metal layers 215 of the extending portion 212 are too thin, pinholes or breakages easily occur, which affects the sealing performance.

Values of R1, R2 and h directly affect a thickness of the metal layer 215 of the extending portion 212. Specifically, when the depth of the concave chamber 25 is constant, the greater a value of R1+R2+h is, the greater inclination of the extending portion 212 with respect to the main body portion 211 is, and the smaller an elongation rate of the metal layer 215 of the extending portion 212 in the stamping process is. That is, by increasing the value of R1+R2+h, the metal layer 215 can be effectively prevented from being too thin, and the sealing performance is ensured. The inventor found that when $R1+R2+h \geq T/5$, the sealing performance of the extending portion 212 can be satisfied.

The greater the value of R1+R2+h is, the larger a size of the secondary battery in the transverse direction Y is, the lower utilization of space in the packaging bag 2 is, and the smaller volumetric energy density of the secondary battery is. To make the volumetric energy density of the secondary battery satisfy requirements, $R1+R2+h \leq T/2$.

Figure 9:
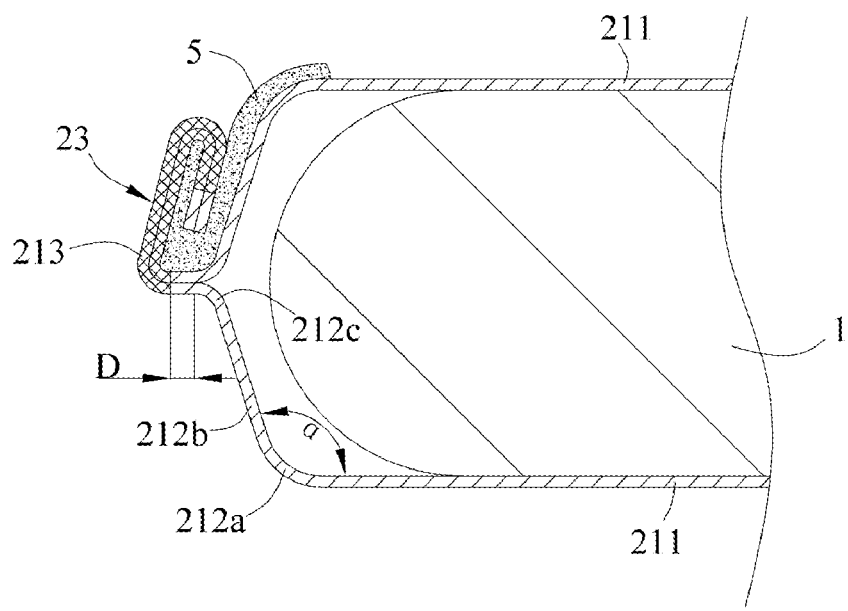
FIG. 9 is another schematic diagram of a secondary battery according to the present application.

With reference to FIG. 9, in the section perpendicular to the longitudinal direction X, an included angle between the main body portion 211 and the inclined region 212b is α. When the electrode assembly 1 expands, the inclined region 212b deforms under the action of the expansion force of the electrode assembly 1. The greater a value of α is, the greater the inclined region 212b is deformable, and the better the release effect of the expansion force is. That is, by increasing the value of α, a risk of failure of connection of the first packaging film 21 and the second packaging film 22 can be effectively reduced, and the sealing performance is improved. However, the greater the value of α is, the lower the utilization of space in the packaging bag 2 is, and the smaller the volumetric energy density of the secondary battery is. The inventor considers the sealing performance and the volumetric energy density comprehensively, and preferably, the value of α is 95°~150°.

When the depth of the concave chamber 25 and a value of h are constant, the greater a value of R1 is, and the smaller a value of R2 is. With reference to FIG. 3 and FIG. 9, the greater the value of R1 is, and the closer the first arc region 212a is to the electrode assembly 1, and the less the first arc region 212a is likely to collapse. The greater a value of R2, the larger space between the second arc region 212c of the first packaging film 21 and the second arc region 212c of the second packaging film 22 is, and the lower the utilization of space in the packaging bag 2 is. After comprehensive consideration by the inventor, preferably, R2≤R1.

The two connecting portions 213 of the first packaging film 21 are respectively the first connecting portion 213a and the second connecting portion 213b, the two connecting portions 213 of the second packaging film 22 are respectively the third connecting portion 213c and the fourth connecting portion 213d, the first connecting portion 213a is connected to the third connecting portion 213c, and the second connecting portion 213b is connected to the fourth connecting portion 213d.

With reference to FIG. 3, the first connecting portion 213a and the third connecting portion 213c each include a transition region 2131 and a welding region 2132, the transition region 2131 is connected to the second arc region 212c, and the welding region 2132 extends from an end part of the transition region 2131 away from the second arc region 212c. The welding region 2132 of the first connecting portion 213a is welded to the welding region 2132 of the third connecting portion 213c to form the first sealing portion 23. The transition region 2131 may play a role of cushioning. When the electrode assembly 1 expands, the transition region 2131 may release the expansion force by means of deformation, a risk of tearing the first sealing portion 23 is reduced, and the sealing performance is ensured.

A size of the transition region 2131 in the transverse direction Y is D. The greater a value of D is, and the lower the risk of tearing the first sealing portion 23 is. However, the greater the value of D is, the larger the size of the secondary battery in the transverse direction Y is, and the lower the energy density is. Therefore, preferably, the size D of the transition region 2131 is 0.5 mm-5 mm.

Preferably, the second connecting portion 213b and the fourth connecting portion 213d each include a transition region 2131 and a welding region 2132, the transition region 2131 is connected to the second arc region 212c, and the welding region 2132 extends from an end part of the transition region 2131 away from the second arc region 212. The welding region 2132 of the second connecting portion 213b is welded to the welding region 2132 of the fourth connecting portion 213d to form another first sealing portion 23.

With reference to FIG. 1, to ensure sealing strength, the first sealing portion 23 needs to have a sufficient width, which causes the first sealing portion 23 to occupy larger space in the transverse direction Y. Preferably, with reference to FIG. 9, the first sealing portion 23 is bent toward a direction close to the electrode assembly 1, and the first sealing portion 23 is bonded to the inclined region 212b through a colloid 5. By bending the first sealing portion 23, the space occupied by the first sealing portion 23 in the transverse direction Y can be reduced, thereby improving the energy density of the secondary battery. Meanwhile, by bending the first sealing portion 23, the risk of tearing the first sealing portion 23 when the electrode assembly 1 expands can also be reduced.

The colloid 5 has certain strength after curing. Preferably, a part of the colloid 5 is bonded to an outer surface of the first arc region 212a. The cured colloid 5 may limit the deformation of the first arc region 212a to reduce the risk of collapse of the first arc region 212a. Meanwhile, when the electrode assembly 1 expands and squeezes the extending portions 212, consistency of forces applied to the extending portions 212 can also be improved, and the stress concentration is reduced.

For the winding electrode assembly 1, the flat plane of the base region 14 is relatively smooth. Preferably, in the transverse direction Y, two ends of the main body portion 211 are both beyond the base region 14, which can avoid squeezing the first arc region 212a by the base region 14, and reduce a risk of deformation of the first arc region 212a.

With reference to FIG. 8 and FIG. 9, in the winding electrode assembly 1, the corner region 15 expands and squeezes the extending portion 212. Preferably, according to the present application, a gap is provided between two adjacent layers of the first electrode sheet 1. The gap may be create cushion space for expansion of the first electrode sheet 1 and the second electrode sheet 2, thereby reducing the pressure of the corner region 15 on the extending portion 212 and reducing the risk of tearing the first sealing portion 23. In addition, in the expansion, the expansion stress in the corner region 15 is the most concentrated. According to the present application, by providing the gap, the stress concentration can be reduced, distortion of the corner region 15 is reduced, and cycle performance and safety performance of the electrode assembly 1 are improved.

The present application will be further described in detail below with reference to embodiments.

Embodiment 1 may be produced according to the following steps.

(i) A positive active substance NCM523, a conductive agent, i.e., acetylene black, and a binder PVDF are mixed in a mass ratio of 96:2:2, a solvent NMP is added, and they are stirred under the action of a vacuum mixer until the system is uniform to obtain positive slurry; and the positive slurry is uniformly coated on aluminum foil, it is transferred to an oven for continuous drying after being dried at a room temperature, and then a first electrode sheet 11 is obtain after cold compression, cutting and slicing.

(ii) A negative active substance, i.e., graphite or a mixture of graphite and other active substances obtained in different mass ratios, the conductive agent, i.e., acetylene black, a thickener CMC and a binder SBR are mixed in a mass ratio of 94.1:1:1.2:1.4, a solvent, i.e., deionized water, is added, and they are stirred under the action of the vacuum mixer until the system is uniform to obtain negative slurry; and the negative slurry is uniformly coated on copper foil, it is transferred to the oven for continuous drying after being dried at the room temperature, and then a second electrode sheet 12 is obtain after cold compression, cutting and slicing.

(iii) Ethylene carbonate (EC), ethyl methyl carbonate (EMC) and diethyl carbonate (DEC) are mixed in a volume ratio of 1:1:1 to obtain an organic solvent, then, intensively dried lithium salt LiPF6 is dissolved in the mixed organic solvent, and an electrolyte with a concentration of 1 mol/L is prepared.

(iv) A polyethylene film is used as a diaphragm 13.

(v) The first electrode sheet 11, the diaphragm 13 and the second electrode sheet 12 are stacked together, wound multiple turns, and then flattened into a flat shape after the winding to produce an electrode assembly 1. After measurement, a size W1 of the electrode assembly 1 in a transverse direction Y is 74.2 mm, a size L1 of the electrode assembly 1 in a longitudinal direction X is 245.5 mm, and a size T of the electrode assembly 1 in a thickness direction Z is 9 mm.

(vi) With reference 5, two concave chambers 25 are formed by stamping on a piece of aluminum plastic film to form a first packaging film 21 and a second packaging film 22 that are integrally arranged. After measurement, a size W2 of an inner surface of a main body portion 211 in the transverse direction Y is 70.2 mm, a size L2 of the inner surface of the main body portion 211 in the longitudinal direction X is 241.5 mm, a radius R1 of an inner surface of a first arc region 212a is 2 mm, a radius R2 of an inner surface of a second arc region 212c is 1.2 mm, a size h of an inner surface of the inclined region 212b in the transverse direction Y is 0.7 mm, and a depth L3 of each concave chamber 25 is 4.5 mm.

(vii) The electrode assembly 1 is welded to an electrode lead 3, and then the electrode assembly 1 is put into the concave chamber of a second packaging film 22. An insulating member 4 and the electrode lead 3 are assembled together in advance.

Figure 5:
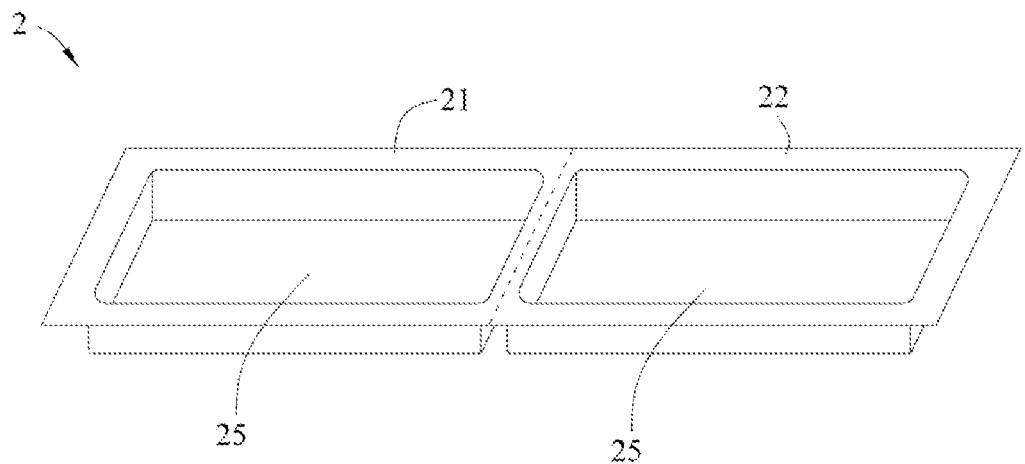
FIG. 5 is a schematic diagram of a packaging bag of the secondary battery of FIG. 1 before molding.

(viii) With reference to FIG. 5, a first packaging film 21 is bend along a dashed line so that the first packaging film 21 covers the electrode assembly 1 from an upper side, and then edge regions of the first packaging film 21 and the second packaging film 22 are thermally compressed by an encapsulation device to form a first sealing portion 23 and a second sealing portion 24. In the thermal compression, a size D of a transition region 2131 in the transverse direction Y is set to be 0.5 mm.

(ix) The electrolyte is injected into a package bag 2, and then processes of standing, chemical conversion, shaping and the like are performed on a battery.

(x) With reference to FIG. 9, a colloid 5 is coated on the first sealing portion 23, and then the first sealing portion 23 is bend so that the first sealing portion 23 is bonded to an extending portion 212. A secondary battery of the present application is obtained after the colloid 5 is cured.

Embodiments 2 to 19 and comparative examples 1 to 5 adopt the same producing method as embodiment 1, the difference is the values of W1, T and D, and the specific parameters are shown as in Table 1.

Sealing tests are performed below on embodiments 1 to 19 and comparative examples 1 to 5.

Specifically, the battery is first put in a vacuum box, and the vacuum box is vacuumized. Then, charging and discharging are performed on the battery in cycles, and in the charging and discharging processes, the battery vibrates in the transverse direction Y with an amplitude of 1 mm, and the frequency of vibration is once every 5 minutes. After 5 hours, an organic gas tester (VOC tester, a model of ppbRAE-3000) is used to detect content of organic gas in the vacuum box.

TABLE 1

Parameters and test results of embodiments 1 to 19 and comparative examples 1 to 5

| | W1 (mm) | W2 (mm) | R1 (mm) | R2 (mm) | h (mm) | T (mm) | D (mm) | W2 + 2*R1 − 1 (mm) | W2 + 2*R1 + 2*R2 + 2*h + 1 (mm) | Content of organic gas (mg/m3) |
|---|---|---|---|---|---|---|---|---|---|---|
| Embodiment 1 | 74.2 | 70.2 | 2 | 1.2 | 0.7 | 9 | 0.5 | 73.2 | 79 | 0.23 |
| Embodiment 2 | 73.7 | 70.2 | 2 | 1.2 | 0.7 | 9 | 0.5 | 73.2 | 79 | 0.31 |
| Embodiment 3 | 73.5 | 70.2 | 2 | 1.2 | 0.7 | 9 | 0.5 | 73.2 | 79 | 0.39 |
| Embodiment 4 | 73.2 | 70.2 | 2 | 1.2 | 0.7 | 9 | 0.5 | 73.2 | 79 | 0.48 |
| Embodiment 5 | 75 | 70.2 | 2 | 1.2 | 0.7 | 9 | 0.5 | 73.2 | 79 | 0.19 |
| Embodiment 6 | 76 | 70.2 | 2 | 1.2 | 0.7 | 9 | 0.5 | 73.2 | 79 | 0.26 |
| Embodiment 7 | 77 | 70.2 | 2 | 1.2 | 0.7 | 9 | 0.5 | 73.2 | 79 | 0.31 |
| Embodiment 8 | 78 | 70.2 | 2 | 1.2 | 0.7 | 9 | 0.5 | 73.2 | 79 | 0.38 |
| Embodiment 9 | 79 | 70.2 | 2 | 1.2 | 0.7 | 9 | 0.5 | 73.2 | 79 | 0.47 |
| Embodiment 10 | 74.2 | 70.2 | 2 | 1.2 | 0.7 | 5 | 0.5 | 73.2 | 79 | 0.18 |
| Embodiment 11 | 74.2 | 70.2 | 2 | 1.2 | 0.7 | 7.8 | 0.5 | 73.2 | 79 | 0.21 |
| Embodiment 12 | 74.2 | 70.2 | 2 | 1.2 | 0.7 | 12 | 0.5 | 73.2 | 79 | 0.29 |
| Embodiment 13 | 74.2 | 70.2 | 2 | 1.2 | 0.7 | 19.5 | 0.5 | 73.2 | 79 | 0.38 |
| Embodiment 14 | 74.2 | 70.2 | 2 | 1.2 | 0.7 | 25 | 0.5 | 73.2 | 79 | 0.48 |
| Embodiment 15 | 74.2 | 70.2 | 2 | 1.2 | 0.7 | 9 | 1 | 73.2 | 79 | 0.19 |
| Embodiment 16 | 74.2 | 70.2 | 2 | 1.2 | 0.7 | 9 | 3 | 73.2 | 79 | 0.17 |
| Embodiment 17 | 74.2 | 70.2 | 2 | 1.2 | 0.7 | 9 | 5 | 73.2 | 79 | 0.17 |
| Embodiment 18 | 74.2 | 70.2 | 2 | 1.2 | 0.7 | 9 | 10 | 73.2 | 79 | 0.16 |
| Embodiment 19 | 74.2 | 70.2 | 2 | 1.2 | 0.7 | 9 | 0.2 | 73.2 | 79 | 0.29 |
| Comparative Example 1 | 73 | 70.2 | 2 | 1.2 | 0.7 | 9 | 0.5 | 73.2 | 79 | 0.52 |
| Comparative Example 2 | 72.7 | 70.2 | 2 | 1.2 | 0.7 | 9 | 0.5 | 73.2 | 79 | 0.57 |
| Comparative Example 3 | 72.4 | 70.2 | 2 | 1.2 | 0.7 | 9 | 0.5 | 73.2 | 79 | 0.64 |

TABLE 1-continued

Parameters and test results of embodiments 1 to 19 and comparative examples 1 to 5

|  | W1 (mm) | W2 (mm) | R1 (mm) | R2 (mm) | h (mm) | T (mm) | D (mm) | W2 + 2*R1 − 1 (mm) | W2 + 2*R1 + 2*R2 + 2*h + 1 (mm) | Content of organic gas (mg/m3) |
|---|---|---|---|---|---|---|---|---|---|---|
| Comparative Example 4 | 80 | 70.2 | 2 | 1.2 | 0.7 | 9 | 0.5 | 73.2 | 79 | 0.55 |
| Comparative Example 5 | 81 | 70.2 | 2 | 1.2 | 0.7 | 9 | 0.5 | 73.2 | 79 | 0.61 |

In the present application, the smaller a value of W1 is, and in the transverse direction Y, the larger a gap between the electrode assembly 1 and the extending portion 212 is. If the gap is too large, when the secondary battery vibrates, the extending portion 212 is unable to effectively limit the electrode assembly 1 to shake in the transverse direction Y, and the shaking electrode assembly 1 pulls the second sealing portion 24 through the electrode lead 3. Comparing embodiments 1 to 9 and comparative examples 1 to 3, when the value of W1 is less than W2+2R1−1, the leakage of organic gas is more serious. In comparison, when the value of W1 is greater than W2+2R1−1, the shake of the electrode assembly 1 can be reduced, the leakage of organic gas is reduced, and the sealing performance of the secondary battery is improved.

The electrode assembly 1 expands in the charging and discharging processes, the expanded electrode assembly 1 pushes the main body portions 211 in the thickness direction Z, and the main body portion 211 pulls the connecting portion 213 through the extending portion 212. The greater the value of W1 is, and in the transverse direction Y, the smaller the gap between the electrode assembly 1 and the extending portion 212 is. If the gap is too small, when the electrode assembly 1 expands, the extending portion 212 is less deformable and unable to effectively release an expansion force, and the expansion force is transferred to the connecting portion 213, which results in failure of connection of the first packaging film 21 and the second packaging film 22 easily, and causes the leakage of the electrolyte. Comparing embodiments 1 to 9 and comparative examples 4 to 5, when the value of W1 is greater than W2+2R1+2R2+2h+1, the leakage of organic gas is more serious. In comparison, when the value of W1 is less than W2+2R1+2R2+2h+1, the expansion force transferred to the connecting portion 213 can be effectively reduced, the risk of failure of connection of the first packaging film 21 and the second packaging film 22 is reduced, the leakage of organic gas is reduced, and the sealing performance of the secondary battery is improved.

The larger the size T of the electrode assembly 1 in the thickness direction Z is, the greater the depth L3 of each concave chamber 25 is, and the greater an elongation rate of the metal layer 215 of the extending portion 212 in the stamping process is. With reference to embodiment 1 and embodiments 10 to 14, when the value of R1+R2+h is constant, as T increases, the amount of leakage of organic gas gradually increases, and the sealing performance is gradually poor. Conversely, when the value of T is constant, by increasing the value of R1+R2+h, the metal layer 215 can be effectively prevented from being too thin, thereby improving the sealing performance.

In the secondary battery, the transition region 2131 may play a role of cushioning. When the electrode assembly 1 expands, the transition region 2131 may release the expansion force by means of deformation, the risk of tearing the first sealing portion 23 is reduced, and the sealing performance is ensured. With reference to embodiment 1 and embodiments 15 to 19, by increasing the value of D, the risk of tearing the first sealing portion 23 can be reduced, the leakage of organic gas is reduced, and the sealing performance is improved.

What is claimed is:

1. A secondary battery, comprising an electrode assembly, a packaging bag and an electrode lead;
   wherein the packaging bag comprises a first packaging film and a second packaging film, the electrode assembly is disposed between the first packaging film and the second packaging film, and the electrode lead is connected to the electrode assembly and extends to an outside of the packaging bag in a longitudinal direction;
   the first packaging film and the second packaging film each comprise a main body portion, two extending portions and two connecting portions, the main body portion is located on one side of the electrode assembly in a thickness direction, the two connecting portions are respectively located on two sides of the electrode assembly in a transverse direction, and the two extending portions respectively extend from two ends of the main body portion in the transverse direction and are respectively connected to the two connecting portions;
   each of the two extending portions comprises a first arc region, an inclined region and a second arc region, the first arc region is connected to an end part of the main body portion in the transverse direction, the second arc region is connected to an end part of the connecting portion close to the main body portion in the transverse direction, and the inclined region is connected between the first arc region and the second arc region;
   the two connecting portions of the first packaging film are respectively connected to the two connecting portions of the second packaging film;
   in a section perpendicular to the longitudinal direction, a size of the electrode assembly in the transverse direction is W1, a size of an inner surface of the main body portion in the transverse direction is W2, a radius of an inner surface of the first arc region is R1, a radius of an inner surface of the second arc region is R2, and a size of an inner surface of the inclined region in the transverse direction is h; and
   W1, W2, R1, R2 and h satisfy the following relational expression:

$W2+2R1-1 \leq W1 \leq W2+2R1+2R2+2h+1;$ wherein units of W1, W2, R1, R2 and h are mm (millimeter) respectively.

2. The secondary battery according to claim 1, wherein W1, W2, R1, R2 and h satisfy the following relational expression:

$W2+2R1-0.5 \leq W1 \leq W2+2R1+2R2+2h.$

3. The secondary battery according to claim 1, wherein in the section perpendicular to the longitudinal direction, a size of the electrode assembly in the thickness direction is T, a unit of T is mm (millimeter); and T, R1, R2 and h satisfy the following relational expression: $T/5 \leq R1+R2+h$.

4. The secondary battery according to claim 3, wherein $R1+R2+h \leq T/2$.

5. The secondary battery according to claim 1, wherein in the section perpendicular to the longitudinal direction, an included angle between the main body portion and the inclined region is 95°~150°.

6. The secondary battery according to claim 1, wherein $R2 \leq R1$.

7. The secondary battery according to claim 1, wherein
the two connecting portions of the first packaging film are respectively a first connecting portion and a second connecting portion, the two connecting portions of the second packaging film are respectively a third connecting portion and a fourth connecting portion, the first connecting portion is connected to the third connecting portion, and the second connecting portion is connected to the fourth connecting portion;
the first connecting portion and the third connecting portion each comprise a transition region and a welding region, the transition region is connected to the second arc region, and the welding region extends from an end part of the transition region away from the second arc region;
the welding region of the first connecting portion is welded to the welding region of the third connecting portion to form a first sealing portion.

8. The secondary battery according to claim 7, wherein in the transverse direction, a size of the transition region is 0.5 mm-5 mm.

9. The secondary battery according to claim 8, wherein the first sealing portion is bent toward a direction close to the electrode assembly.

10. The secondary battery according to claim 9, wherein the first sealing portion is bonded to the inclined region through a colloid.

11. The secondary battery according to claim 10, wherein a portion of the colloid is bonded to an outer surface of the first arc region.

12. The secondary battery according to claim 1, wherein the electrode assembly comprises a first electrode sheet, a second electrode sheet and a diaphragm, the diaphragm isolates the first electrode sheet from the second electrode sheet, and the first electrode sheet, the diaphragm and the second electrode sheet are wound into an integral body.

13. The secondary battery according to claim 12, wherein the electrode assembly has a base region and two corner regions, the two corner regions are respectively located at two ends of the base region in the transverse direction; and an outer surface of the base region is a flat plane, and an outer surface of each of the two corner regions is an arc surface.

14. The secondary battery according to claim 13, wherein in the transverse direction, the two ends of the main body portion are both beyond the base region.

15. The secondary battery according to claim 14, wherein in the each of the two corner regions, the first electrode sheet is set in multiple layers, and a gap is provided between two adjacent layers of the first electrode sheet.

16. The secondary battery according to claim 1, wherein the secondary battery further comprises an insulating member.

17. The secondary battery according to claim 16, wherein a part of the insulating member is clamped between the first packaging and the second packaging film.

18. The secondary battery according to claim 16, wherein the number of insulating parts is 2.

19. The secondary battery according to claim 1, wherein a concave chamber is each formed on the first packaging film and the second packaging film.

20. The secondary battery according to claim 19, wherein the main body portion is a bottom wall of the concave chamber in a thickness direction, and the two extending portions are two side walls of the concave chamber in the transverse direction, respectively.

* * * * *